United States Patent
Hutten et al.

(10) Patent No.: US 12,112,436 B2
(45) Date of Patent: Oct. 8, 2024

(54) SYSTEMS AND METHODS OF IMPLEMENTING REAL-WORLD AMBIENT VARIANCE IN AUGMENTED ENVIRONMENTS

(71) Applicant: Wormhole Labs, Inc., North Hollywood, CA (US)

(72) Inventors: Curtis Hutten, Laguna Beach, CA (US); Robert D. Fish, Irvine, CA (US)

(73) Assignee: Wormhole Labs, Inc., North Hollywood, CA (US)

( * ) Notice: Subject to any disclaimer, the term of this patent is extended or adjusted under 35 U.S.C. 154(b) by 57 days.

(21) Appl. No.: 17/703,837

(22) Filed: Mar. 24, 2022

(65) Prior Publication Data

US 2022/0309755 A1    Sep. 29, 2022

Related U.S. Application Data

(60) Provisional application No. 63/165,279, filed on Mar. 24, 2021.

(51) Int. Cl.
*G06T 19/00* (2011.01)
*G06F 3/14* (2006.01)
(Continued)

(52) U.S. Cl.
CPC .......... *G06T 19/006* (2013.01); *G06F 3/1454* (2013.01); *G06F 3/165* (2013.01);
(Continued)

(58) Field of Classification Search
CPC ....... G06T 19/006; G06T 13/40; G06T 15/20; G06T 2219/024; G06T 2200/28; G06F 3/1454; G06F 3/165; G06F 3/167; G06F 3/147; G10L 21/034; H04S 1/007; H04S 7/303; H04S 2400/11; G09G 3/003; G09G 2360/121; G09G 2370/022
See application file for complete search history.

(56) References Cited

U.S. PATENT DOCUMENTS

| | | |
|---|---|---|
| 6,414,696 B1 | 7/2002 | Ellenby et al. |
| 7,564,469 B2 | 7/2009 | Cohen |

(Continued)

OTHER PUBLICATIONS

Punwani et al., Methods and Systems for Simulating In-Person Interactions in Virtual Environments, U.S. Appl. No. 63/093,769, filed Oct. 19, 2020, 1-48 pages. (Year: 2020).*

*Primary Examiner* — Jeffery A Brier
(74) *Attorney, Agent, or Firm* — Fish IP Law, LLP

(57) ABSTRACT

In a computer-implemented method of implementing real-world limitations in shared environment, an environment engine is configured to receive a user selection of a shared environment, wherein the shared environment represents a real-world environment. The environment engine retrieves spatial data associated with the shared environment and retrieves environmental sensor data associated with the shared environment. The environmental sensor data is contemplated to capture a varying ambient environment of the shared environment, which includes at least one of audio data and image data associated with the real-world environment. The environment engine is further configured to render a first user avatar and a second user avatar within the shared environment.

16 Claims, 7 Drawing Sheets

(51) Int. Cl.
*G06F 3/16* (2006.01)
*G06T 13/40* (2011.01)
*G06T 15/20* (2011.01)
*G10L 21/034* (2013.01)
*H04S 1/00* (2006.01)
*H04S 7/00* (2006.01)

(52) U.S. Cl.
CPC ............. *G06T 13/40* (2013.01); *G06T 15/20* (2013.01); *G10L 21/034* (2013.01); *H04S 1/007* (2013.01); *H04S 7/303* (2013.01); *G06T 2200/28* (2013.01); *G06T 2219/024* (2013.01); *H04S 2400/11* (2013.01); *H04S 2400/13* (2013.01)

(56) References Cited

U.S. PATENT DOCUMENTS

| | | | |
|---|---|---|---|
| 8,727,892 B1* | 5/2014 | Chun | G07F 17/3225 463/40 |
| 2007/0179867 A1 | 8/2007 | Glazer et al. | |
| 2011/0216179 A1* | 9/2011 | Dialameh | G06F 16/955 348/E7.085 |
| 2014/0172640 A1 | 6/2014 | Argue et al. | |
| 2015/0077502 A1* | 3/2015 | Jordan | H04N 7/142 348/14.03 |
| 2017/0169610 A1 | 6/2017 | King | |
| 2017/0243403 A1* | 8/2017 | Daniels | G06F 3/1454 |
| 2022/0124286 A1* | 4/2022 | Punwani | H04N 7/157 |

* cited by examiner

SYSTEMS AND METHODS OF IMPLEMENTING REAL-WORLD AMBIENT VARIANCE IN AUGMENTED ENVIRONMENTS

This application claims priority to U.S. provisional application 63/165,279, filed Mar. 24, 2021. U.S. provisional application 63/165,279 and all other extrinsic references contained herein are incorporated by reference in their entirety.

FIELD OF THE INVENTION

The field of the invention is augmented reality environments.

BACKGROUND

The present invention enables individuals to be immersed in augmented reality and/or virtual reality environments by implementing changes in real-world spaces and their associated limitations therein. In doing so, the present invention allows for increasingly immersive experiences that mimic the complexity and variability of the real-world. For example, the inventive concepts herein can enable a non-real-world environment mimicking a clothing store to close its doors to customers after business hours. In another example, the inventive concepts herein can introduce the challenges of ambient noise into a virtual space that is a substantially real-time representation of a real-world environment. In doing so, users can feel additional layers of immersion by, for example, requiring a user's avatar to move closer to another avatar in a venue to hear an audio transmission of another user's voice over the music playing at the venue.

US Patent Application No. 2007/0179867 A1 to Glazer teaches a virtual reality shopping experience. Glazer, however, fails to disclose a system and method that implements real-world limitations in an augmented reality and/or virtual reality space. For example, Glazer fails to contemplate the ambient variables associated with real-world environments, such as background noise, changes in lighting over the course of the day, and the limitations associated with real-world schedules.

US Patent Application No. 2014/0172640 A1 to Argue teaches an augmented reality shopping game. Argue, however, fails to disclose a system and method that implements real-world limitations in an augmented reality and/or virtual reality space. As with Glazer, Argue fails to contemplate implementing the ambient variables associated with real-world environments, such as background noise, changes in lighting over the course of the day, and the limitations associated with real-world schedules.

Glazer, Argue, and all other extrinsic materials discussed herein are incorporated by reference to the same extent as if each individual extrinsic material was specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for systems and methods of implementing real-world ambient variables in augmented reality and virtual reality environments.

SUMMARY OF THE INVENTION

The inventive concepts herein contemplate virtual reality, augmented reality, and/or mixed reality environments that incorporate real-world limitations associated with a real-world environment in virtual and/or augmented reality spaces mimicking the real-world environment.

In the prior art, augmented reality enhances user's skills with little regard for the limitations of the real-world. For example, many virtual environments, such as in games, have an internal clock that does not mimic the passage of time in the real-world counterpart environment of the virtual environment. Instead, conventional augmented reality and virtual reality systems control environmental variables such that variables, such as time and ambient environmental effects, are artificially controlled.

In traditional augmented reality applications, the experience is presented in first-person such that the modeling of the sensory experience is approximately that of the user in their real-world environment. This limits the experience to what the user can already experience, and thus fails to take advantage of the possibilities of the digital experience.

The inventive concepts herein further contemplate introducing real-world limitations into augmented reality and virtual spaces in order to increase user immersion.

Various resources, features, aspects and advantages of the inventive subject matter will become more apparent from the following detailed description of preferred embodiments, along with the accompanying drawing figures in which like numerals represent like components.

DETAILED DESCRIPTION

Figure 1:
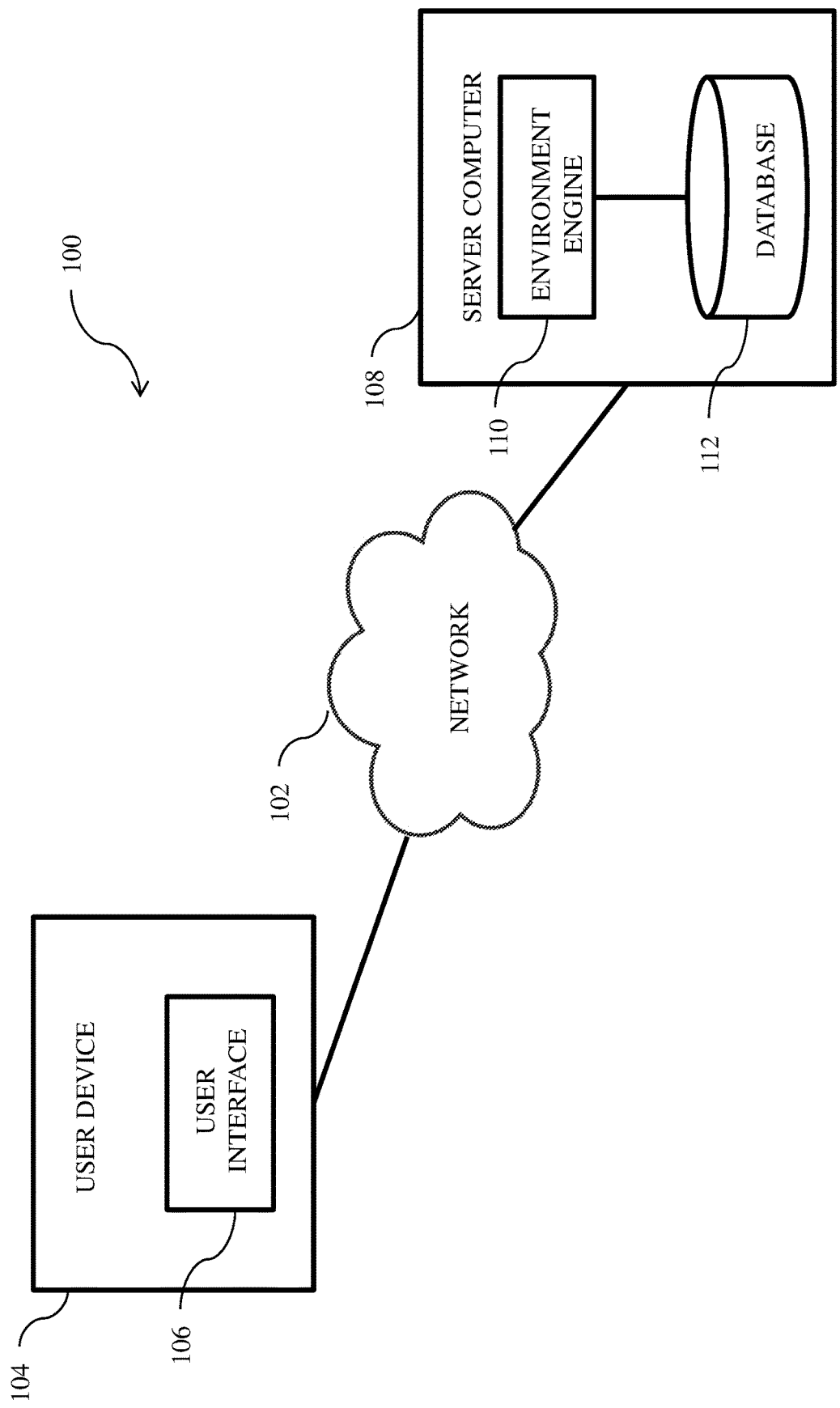
FIG. 1 is a functional block diagram illustrating a distributed data processing environment.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the following description is drawn to various alternative configurations are also deemed suitable and may employ various computing devices including servers, interfaces, systems, databases, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclose apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including allowing users to access augmented reality environments and/or virtual reality environments. Mixed reality environments can include any combination of virtual and augmented reality environments and can be connected to each other in any manner.

For the purposes of this application, sub-environments can comprise any one or more of an augmented reality, a virtual reality, and any other interactive media format. For example, a primary sub-environment can be a first augmented reality, and a secondary sub-environment can be a second augmented reality connected to the first through a portal.

As used herein, volumetric representations can be any rendered environment. In preferred embodiments, volumetric representations are "pop-up space" accessible by remote users.

For the purposes of this application, "portal" or any similar terms, such as "portalling" and "portalled" mean any connections between or among environments. Portals can be in the form of interactive objects, designated spaces, or any other form that allows a user to connect to other augmented realities and/or virtual realities.

As used herein, spatial data can comprise any data that is used to create a volumetric representation of a physical space. It is contemplated that spatial data can include data from any type of sensor used to capture a surrounding environment.

In one embodiment, spatial data can include data from optical sensors used to capture an image of the environment. It is contemplated that any one or more analytical techniques can be applied to the images to construct a volumetric representation of the environment. For example, spatial data can use an object recognition technique to determine the content of the picture and apply the appropriate volumetric translation into the volumetric representation.

In another embodiment, spatial data can include data from reflection-based imaging. For example, spatial data can use light detection and ranging (LIDAR) systems to create a high resolution image of the surrounding environment. However, reflection-based imaging is not limited to LIDAR and any reflection-based system is contemplated herein.

In yet another embodiment, spatial data include data from radio wave detection systems. For example, spatial data can use radar technology to determine the relative distance between the source of the radio wave and the detected object.

A virtual environment can include virtual elements and augmented reality elements. Augmented reality elements are derived from physical spaces in the real world. In preferred embodiments, the virtual environment comprises both virtual elements and augmented reality elements presented in the virtual environment. For example, the virtual environment can be a three-dimensional representation of the Earth where augmented reality elements are distributed within the three-dimensional representation of the Earth. In a more specific example, the augmented reality elements can be tied to specific individuals and contain representations of the individuals' real-world environments by any means known in the art, including 360° cameras, conventional video cameras, and stitched photos from cameras.

FIG. 1 is a functional block diagram illustrating a distributed data processing environment.

The term "distributed" as used herein describes a computer system that includes multiple, physically distinct devices that operate together as a single computer system. FIG. 1 provides only an illustration of one implementation, and does not imply any limitations with regard to the environments in which different embodiments may be implemented. Many modifications to the depicted environment may be made by those skilled in the art without departing from the scope of the invention as recited by the claims.

Distributed data processing environment 100 includes user device 104 and server computer 108, interconnected over network 102. Network 102 can include, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between user device 104, server computer 108, and any other computing devices (not shown) within distributed data processing environment 100.

It is contemplated that user device 104 can be any programmable electronic computing device capable of communicating with various components and devices within distributed data processing environment 100, via network 102. It is further contemplated that user device 104 can execute machine readable program instructions and communicate with any devices capable of communication wirelessly and/or through a wired connection. User device 104 includes an instance of user interface 106.

User interface 106 provides a user interface to environment engine 110. Preferably, user interface 106 comprises a graphical user interface (GUI) or a web user interface (WUI) that can display one or more of text, documents, web browser windows, user option, application interfaces, and operational instructions. It is also contemplated that user interface can include information, such as, for example, graphics, texts, and sounds that a program presents to a user and the control sequences that allow a user to control a program.

In some embodiments, user interface can be mobile application software. Mobile application software, or an "app," is a computer program designed to run on smart phones, tablet computers, and any other mobile devices.

User interface 106 can allow a user to register with and configure environment engine 110 (discussed in more detail below) to enable a user to access a mixed reality space. It is contemplated that user interface 106 can allow a user to provide any information to environment engine 110.

The environment engine 110 can comprise computer-executable program instructions that are stored in one or more non-transitory computer-readable storage medium that, when executed by a computer processor, execute the processes of the inventive subject matter discussed herein.

Server computer 108 can be a standalone computing device, a management server, a web server, a mobile computing device, or any other computing system capable of receiving, sending, and processing data.

It is contemplated that server computer 108 can include a server computing system that utilizes multiple computers as a server system, such as, for example, a cloud computing system.

In other embodiments, server computer 108 can be a computer system utilizing clustered computers and components that act as a single pool of seamless resources when accessed within distributed data processing environment 100.

Database 112 is a repository for data used by environment engine 110. In the depicted embodiment, environment engine 110 resides on server computer 108. However, database 112 can reside anywhere within a distributed data processing environment provided that environment engine 110 has access to database 112.

Data storage can be implemented with any type of data storage device capable of storing data and configuration files that can be accessed and utilized by server computer 108. Data storage devices can include, but are not limited to, database servers, hard disk drives, flash memory, and any combination thereof.

Figure 2:
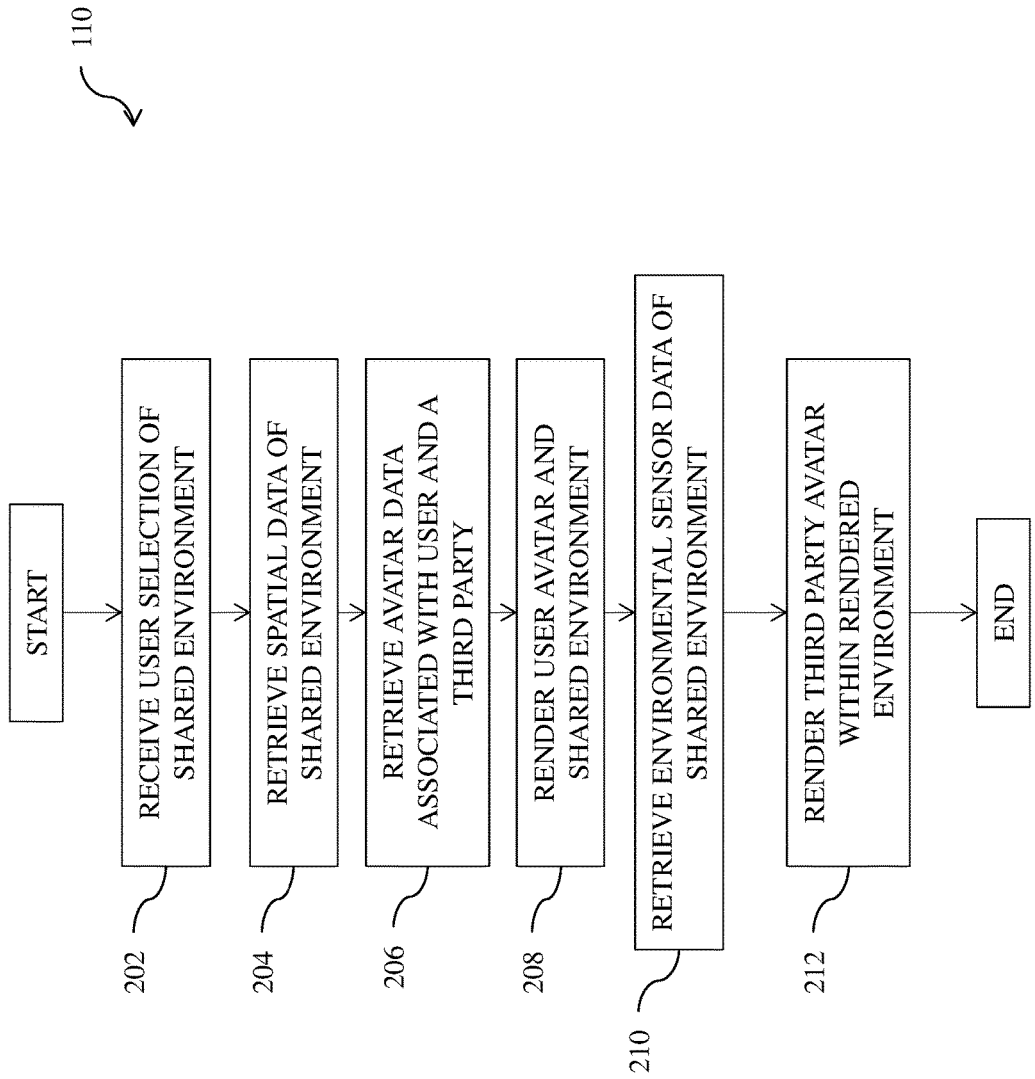
FIG. 2 is a schematic of a method of rendering avatars in a shared environment that captures a real-world counterpart environment.

FIG. 2 is a schematic of a method of rendering avatars in a shared environment that captures a real-world counterpart environment.

As discussed herein, a shared environment refers to what can otherwise be called a mixed reality environment or augmented reality environment that can be accessed by multiple users. Thus, a shared environment will include a digital representation of a real-world environment that will have virtual elements such as avatars overlaid therein, appearing to be a part of or interacting with the real-world environment.

Environment engine 110 receives a user selection of a shared environment (step 202). In embodiments, the shared environment can be a shared environment that corresponds to a real-world environment in which the user is. In these embodiments, the selection by the user can comprise the user starting an application to participate in the shared environment. In other embodiments, the shared environment can correspond to a real-world environment that is remote to the user. The shared environments can be selected from an interface that presents the available shared environments.

Environment engine 110 obtains spatial data of the shared environment (step 204). The spatial data can be obtained in one or more of several ways.

For example, in embodiments, the environment engine 110 can obtain spatial data of the shared environment from a camera or other sensor of a device within the environment. This camera captures image data (i.e., still images or video), audio data (i.e., environmental sounds) and other sensory data (e.g., temperature data, humidity, air quality data, etc.) of the environment that then contains a digital representation of the environment itself. The environment engine 110 can then apply image recognition techniques (e.g., edge detection, SIFT, etc.) to derive a digital version of the real-world environment that includes spatial data of the environment such as the distances between objects in the environment, the placement of objects within the environment, etc.

In other embodiments, the environment engine 110 can retrieve a previously-created digital model of the real-world environment from a database. The digital model can be one that was previously created, which mirrors the real-life dimensions of the real-world environment. In other words, the digital model (which can be a 3D digital model or a 2D digital model, depending on the application) is positioned within the digital shared environment to align with the digital representation of the real-world object. This digital model is then applied to the augmented reality/shared environment such that augmented reality assets (such as user avatars) can be applied and made to appear to interact with the real-world environment by interacting with the model. An example of such a model used in an augmented reality application can be seen in U.S. Pat. No. 6,414,696 to Ellenby. Other known uses of a digital model within an augmented reality environment are also suitable for the purposes of the inventive subject matter.

In embodiments, a combination of both of the techniques discussed above can be used. For example, a digital model of a real-world bar can be used to construct the shared environment with regard to the permanent fixtures of the bar—the doors, the bar area, bathroom locations, etc. For the real-world objects that are not permanent (i.e., objects that can be moved), the image recognition techniques can be used to recognize the locations of those objects within the shared environment. Thus, the system can accurately model objects such as chairs, glasses, or bottles that can be moved around by the real-world patrons of the real-world bar.

Environment engine 110 retrieves avatar data associated with a first user (step 206). Avatar data can include data such as appearance data that governs how the avatar looks within the shared environment. The avatar data can also include data such as a location within the shared environment in which the avatar is to be positioned upon generation.

Environment engine 110 renders the shared environment including an avatar of the first user (step 208). This shared environment is then visible to the first user through their device. It is contemplated that the user's device can be an augmented reality device that the first user uses to view the shared environment. Contemplated augmented reality devices can include smartphones, tablets, laptops, augmented reality glasses, or other computing devices that can capture image and (optionally) sound data from the real-world environment and present it to the user along with the shared environment applied via a screen. In these embodiments, the first user is therefore physically present in the real-world environment.

In other embodiments, information about the real-world environment can be captured by sensors (e.g., cameras, microphones, etc.) located at the real-world environment but the shared environment is presented via a screen to a user that is not physically present at the real-world environment. This user would still see the virtual elements incorporated into the imagery of the real-world environment.

It should be appreciated that the presented shared environment discussed herein is preferably presented in third person such that the first user's avatar is visible by the first user and that the first user's avatar does not necessarily participate in the shared environment from the first user's real-world perspective or position relative to the viewed shared environment. This contrasts with traditional augmented reality environments that present a first-person experience to the user.

Environment engine 110 retrieves environmental sensor data associated with the shared environment (step 210). This can include additional image data from a camera (a user's device that is physically present, one or more cameras distributed within the real-world environment, and/or a combination thereof), additional sound data from microphones (on a user's device, distributed among the environment, and/or a combination), and other sensor data from other sensors within the environment (again, which can be on the user's device, on other devices within the physical environment, and/or a combination thereof). This retrieval of additional environmental sensor data can be ongoing and/or periodic such that the shared environment is updated to account for changes in the real-world environment (which can include changes of a perspective of the user's device used to participate in the shared environment). It should be appreciated that the rendering process of step 208 can be continually repeated to account for the changes in the real-world environment as detected in step 210.

Environment engine 110 renders the shared environment and can also include a third party avatar within the shared environment (step 212). The third party avatar can correspond to a different user that is participating in the shared environment. To do so, the environment engine 110 receives a communication that includes avatar data associated with the third party avatar. This avatar data can include data regarding the appearance of the third party avatar as well as it's location within the shared environment (e.g., where the third party avatar will appear to be within the shared environment from the first user's perspective).

At this stage, the generation process executed by the environment engine 110 is considered to have ended. However, as noted above, the environment engine 110 can continue to receive new information about the real-world environment and continue to update the shared environment accordingly. Additionally, the environment engine 110 can update to include new avatars corresponding to additional users as they enter the shared environment.

Figure 3:
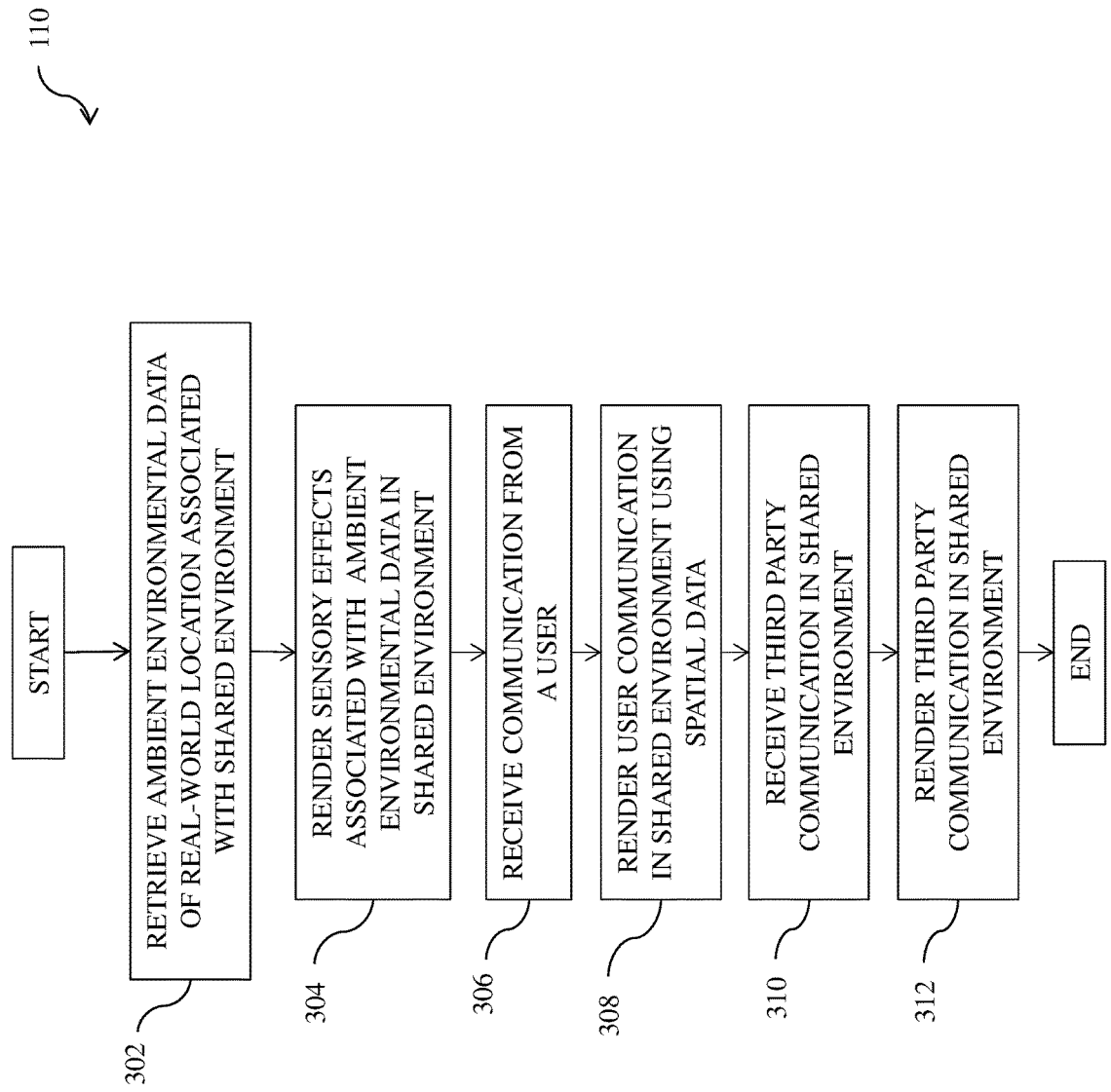
FIG. 3 is a schematic of a method of enabling avatar interactions within a shared environment with rendered sensory effects associated with ambient environmental data in a shared environment.

FIG. 3 is a schematic of a method of enabling avatar interactions within a shared environment with rendered sensory effects associated with ambient environmental data in a shared environment.

Environment engine 110 retrieves ambient environmental data of a real-world environment associated with the shared environment (step 302). This can be the same as step 210 of FIG. 2. For visual data, the ambient environmental data can include lighting conditions in the various parts of the visible real-world environment, obstructions (e.g., structures within the environment, furniture, people), or other environmental factors that can affect visibility (e.g., smoke, mist, fog, steam, visual distortions due to heat, glares, etc.). The visual data can be obtained via one or more cameras within the real-world environment. For sound data, the ambient environmental data can include a general background noise level for the real-world environment as well as specific sources of noise that are picked up by one or more microphones within the real-world environment (e.g., sources of loud sounds such as speakers, yelling, or other loud noises) as well as the location within the real-world environment of the sounds perceived by the microphone(s). Other ambient environmental data can include temperature data (perceived by one or more thermometers within the real-world environment), humidity, etc.

As noted elsewhere, the sensors (camera(s), microphone(s), etc.) can be sensors on computing devices of one or more of the users of the systems of the inventive subject matter located within the real-world environment, and/or can be one or more of these sensors distributed within the real-world environment that gather the ambient environmental data for processing by the environment engine 110 for eventual presentation of the shared environment on remote users' computing devices. Thus, a location might have a series of cameras, microphones, etc., distributed within the real-world location to better provide an accurate representation of the real-world environment and its associated conditions within the shared environment.

Environment engine 110 renders ambient environmental data of a real-world environment associated with the shared environment (step 304). This can be the same as step 208 of FIG. 2, which as discussed before can be ongoing to ensure that the rendered environment is updated in real-time to changes. This can include a rendering of the lighting conditions, sound conditions and other environmental conditions in such a way that the would appear to affect virtual elements (avatars and other virtual elements) in a manner consistent and seamless with how these conditions affect real-world objects within the real-world environment. To do so, the environment engine 110 can employ graphical techniques to apply lighting effects to virtual elements to mirror the lighting conditions of the real-world environments. Likewise, the environment engine 110 can apply stereo- or surround-sound techniques to apply noise at appropriate levels and from appropriate sources within the shared environment.

Environment engine 110 receives a first communication from the first user (step 306). Generally speaking, a communication is intended to refer to an attempt from a first user to communicate, via their avatar, to a second user via the second user's avatar. Thus, the communication can be verbal or non-verbal. For example, a user speaking into their microphone is then received by the environment engine 110. Likewise, a user activating a command (via keyboard, mouse, stylus, touchscreen, etc.) that results in a gesture by the avatar would be considered a communication. In embodiments, a communication can be a message typed on a keyboard that is then spoken by the avatar using text-to-speech. In other embodiments, the communication can be a typed message that is to be displayed near the user's avatar for the other user to receive via their avatar.

Environment engine 110 renders the first communication from the first user in a shared environment using spatial data (step 308). As noted in greater detail below, rendering the first communication from the first user in the shared environment can comprise the environment engine 110 effecting the communication such that it appears to originate from the first user's avatar within the shared environment. Thus, for speech, the acoustic properties of the room, the spoken volume of the voice, and the position of the avatar in the shared environment relative to other avatars in the shared environment can affect how other users hear the communication. As further explained below, the environment engine 110 also renders ambient environmental conditions that can affect the receiving of the communication. For example, ambient noise would not affect the volume of the speech from the first user via their avatar, but it would affect other users' ability to hear the message. The rendering can, in embodiments, be textual that accompany the spoken voice of the avatar.

In rendering communications, the environment engine 110 renders the speaking avatar such that the lips move along with the spoken words and/or the textual speech presented.

In embodiments, the communication can be in the form of a facial expression (e.g., angry, interested, flirty, etc.).

Environment engine 110 receives a second communication from a third-party user (step 310). The third party user can be a second user associated with a second avatar within the shared environment, that wishes to communicate with the first user or another user. The second communication can be received in a fashion similar to how other communications are received (as described with regard to step 306). It should be noted that the second communication does not necessarily have to be in the same modality as the first communication (e.g., the first communication could be gesture, and the second communication could be speech).

Environment engine 110 renders the second communication from the third-party user in the shared environment using spatial data (step 312). The rendering for the second communication and any other communications can be performed in the same manner(s) as the first communication of step 308.

Figure 4:
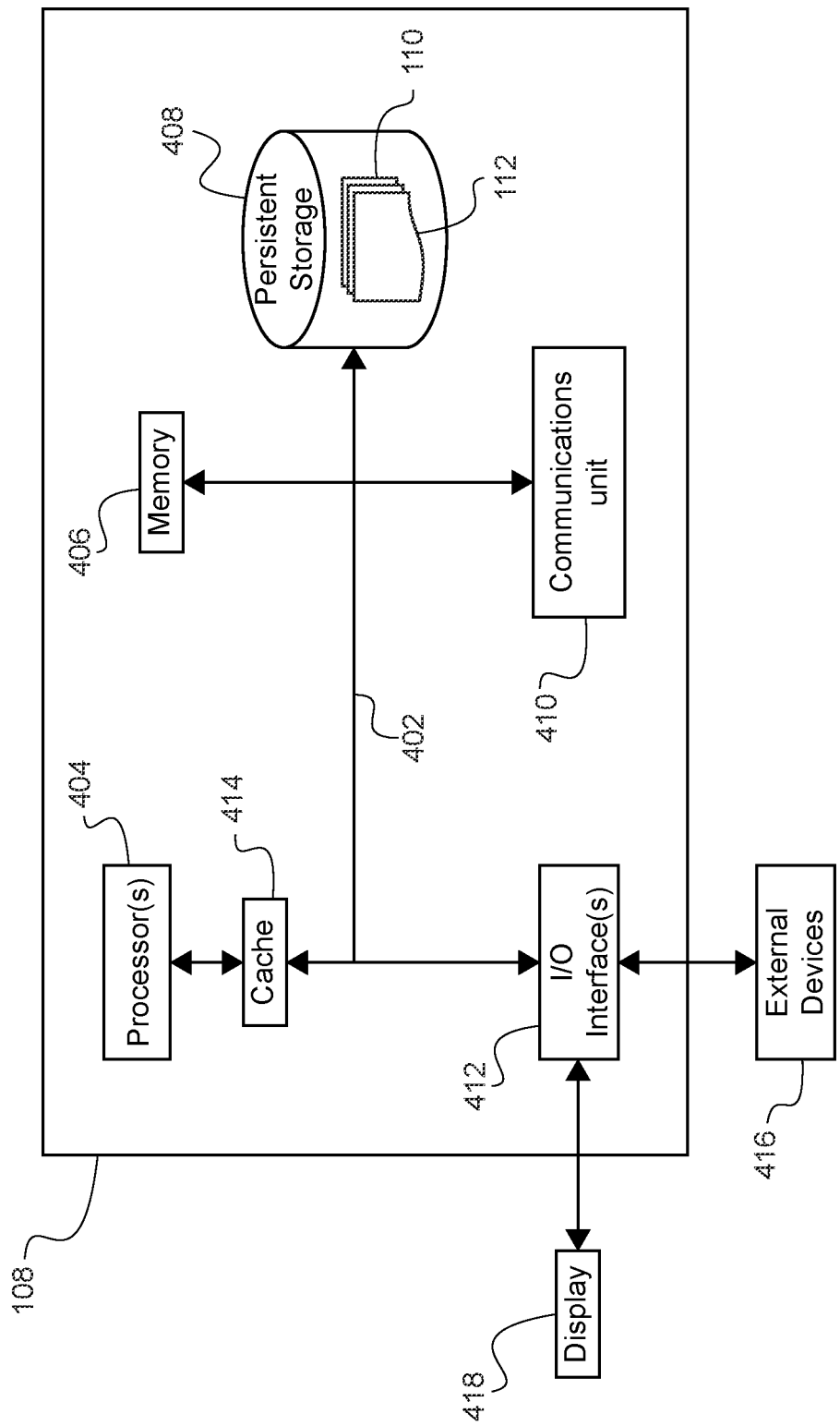
FIG. 4 depicts a block diagram of components of the server computer executing the environment engine within the distributed data processing environment of FIG. 1, in accordance with an embodiment of the present invention.

FIG. 4 depicts a block diagram of components of a server computer 108 executing environment engine 110 (not shown) within the distributed data processing environment of FIG. 1.

Server computer 108 generally includes processor(s) 404, cache 414, memory 406, persistent storage 408, communications unit 410, input/output (I/O) interface(s) 412, and communications fabric 402.

Communications fabric 402 provides a communication medium between cache 414, memory 406, persistent storage 408, communications unit 410, and I/O interface 412. Communications fabric 402 can include any means of moving data and/or control information between computer processors, system memory, peripheral devices, and any other hardware components. As seen in FIG. 4, I/O interface 412 can be used to connect with external devices 416.

Memory 406 and persistent storage 408 are computer readable storage media. As depicted, memory 406 can include any volatile or non-volatile computer storage media. For example, volatile memory can include dynamic random-access memory and/or static random-access memory. In another example, non-volatile memory can include hard disk drives, solid state drives, semiconductor storage devices, a read-only memory (ROM), an erasable programmable read-only memory (EPROM), a flash memory, and any other storage medium that does not require a constant source of power to retain data.

In one embodiment, memory 406 and persistent storage 408 are random access memory and a hard drive hardwired to user device 104, respectively. For example, user device 104 can be a computer executing the program instructions of context engine 110 communicatively coupled to a solid-state drive and DRAM.

In some embodiments, persistent storage 408 is removable. For example, persistent storage 408 can be a thumb drive or a card with embedded integrated circuits.

Communications unit 410 provides a medium for communicating with other data processing systems or devices, including data resources used by user device 104. For example, communications unit 410 can comprise multiple network interface cards. In another example, communications unit 410 can comprise physical and/or wireless communication links.

It is contemplated that environment engine 110, database 112, and any other programs can be downloaded to persistent storage 408 using communications unit 410.

In preferred embodiment, it's important to provide real-time environment, which at least currently can advantageously be provided by GPS, which can track real-time environment data of one or more users. Communications unit 410 comprises a global positioning satellite (GPS) device, a cellular data network communications device, and short to intermediate distance communications device (e.g., Bluetooth®, near-field communications, etc.). It is contemplated that communications unit 410 allows computing device 404 to communicate with other computing devices 104 associated with other users.

Display 418 is contemplated to provide a mechanism to display information from context engine 110 through user device 104. In preferred embodiments, display 418 can have additional functionalities. For example, display 418 can be a pressure-based touch screen or a capacitive touch screen.

In yet other embodiments, display 418 can be any combination of sensory output devices, such as, for example, a speaker that communicates information to a user and/or a vibration/haptic feedback mechanism. For example, display 418 can be a combination of a touchscreen in the dashboard of a car, a voice command-based communication system, and a vibrating bracelet worn by a user to communicate information through a series of vibrations.

It is contemplated that display 418 does not need to be physically hardwired components and can, instead, be a collection of different devices that cooperatively communicate information to a user.

Figure 5A:
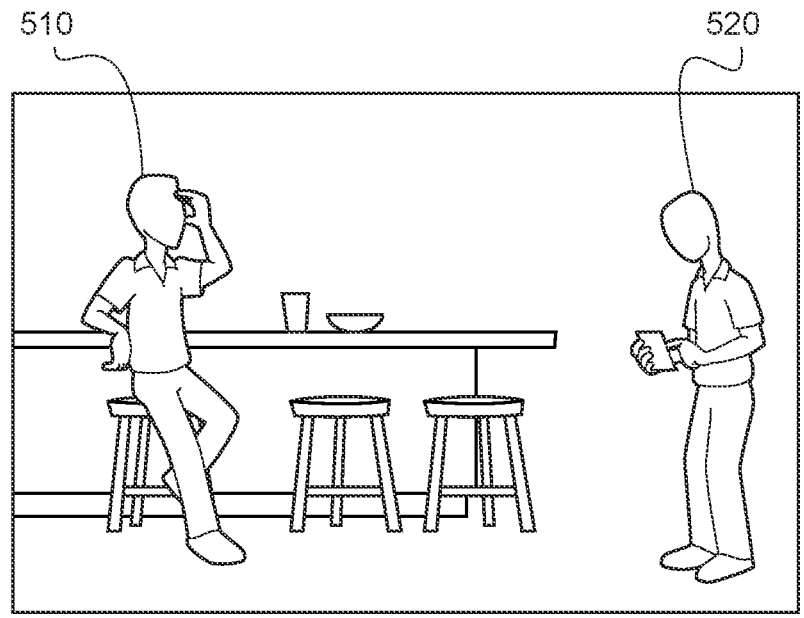
FIGS. 5A and 5B depict an illustrative embodiment of a shared environment subject to substantially similar visual limitations of a corresponding real-world environment.
Figure 5B:
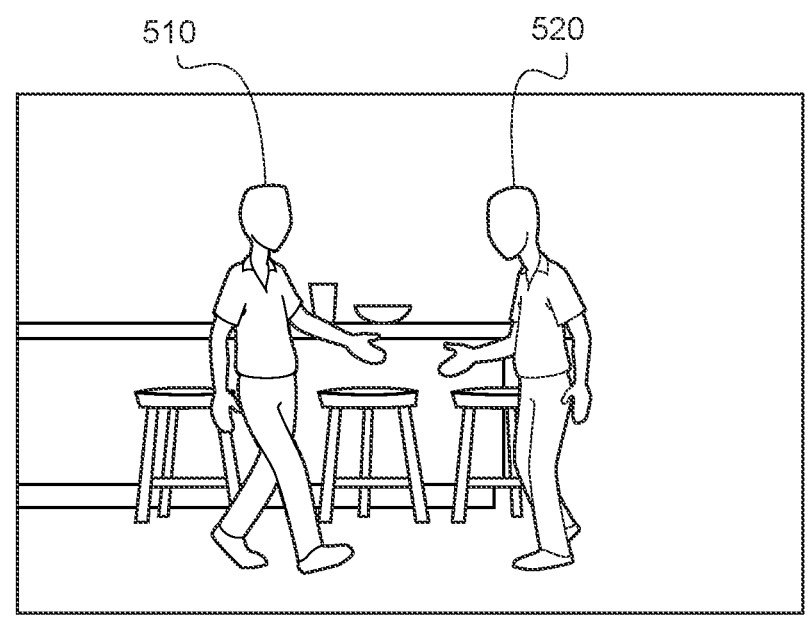

FIGS. 5A and 5B depict an illustrative embodiment of a shared environment subject to substantially similar visual limitations of a corresponding real-world environment.

FIG. 5A shows a view of a shared environment 500 that includes a depiction of a real-world environment (a bar) as seen through the augmented reality display of a user within that real-world environment.

In one embodiment, environment engine 110 creates a visual rendering of each of the visual elements in the environment that reflects the spatial position of the visual elements and their respective appearance in a user environment. For example, environment engine 110 can determine the spatial position of a second user with respect to a first user's perspective in a shared environment and create a first visual rendering including the visual limitations associated with the environment and the users. In a more specific example, environment engine 110 can determine that a second user that is 10 feet away from a first user in a shared environment representing a lowly-lit real-world bar and render a visual representation of the second user that obscures visual details associated with the second user caused by the distance and the lighting conditions. By closing the distance between the first user and the second user, the first user can, as in the real-world environment, see the second user with more clarity.

FIG. 5A shows the rendering of the avatars 510, 520 within the real-world environment, as seen from the perspective of a first user present in the real-world environment. It should be appreciated that the avatars 510, 520 are generated and presented by the environment engine 110 such that they appear to be seamlessly placed in the real-world environment and appear to interact with a real-world object in the environment. Thus, the avatar 510 could be made to appear to be sitting on a real-world stool present at the real-world bar.

As seen in FIG. 5A, the avatar 510 of the first user is across the bar from the avatar 520 of the second user. In rendering the avatar 520 as seen by the first user via the augmented reality display, the environment engine 110 renders the avatar 520 as it would appear from the position of the avatar 510, not the real-world position of the user. Thus, if real-world environmental conditions (including the distance between the avatars 510, 520, smoke or otherwise hazy conditions, lighting conditions, etc.) and/or real-world obstacles would affect the view of avatar 520 from the position of avatar 510, the environment engine 110 accounts for these conditions in how it presents avatar 520 to the user.

The environment engine can do this by analyzing environmental factors in the form of ambient environment data and applying them to the render of the avatars and the conversations between avatars, as discussed herein. As discussed herein, this ambient environment data can be obtained from one or more cameras and/or other sensors in the real-world environment. In one example, the environment engine 110 is programmed to apply image recognition techniques to determine the lighting characteristics of the real-world environment at the location within the shared environment that the avatar is to be rendered. Based on this determination, the environment engine 110 can then adjust the presentation of the avatar so that the brightness, colors, and contrast of the avatar matches the lighting conditions of the real-world environment as seen from the other avatar. Likewise, using image recognition techniques and/or a virtual model of the real-world environment, the environment engine 110 can determine whether any obstacles exist between the two avatars 510, 520. The environment engine 110 can then adjust the presentation of the avatar within the shared environment so that the avatar 520 is appropriately obscured by the obstacles—even if those obstacles may not in the line of sight from the perspective of the first user. For example, if a table is between the first avatar 510 and the second avatar 520 such that part of the avatar 520 would be obscured from the avatar 510's perspective, the environment engine 110 detects the presence of the table and adjusts the rendering of the avatar 520 to match so that the avatar 520 appears appropriately obscured by the table.

Thus, in FIG. 5A, the avatar 520 might look dark (depending on lighting conditions in the real-world environment and specifically where the avatar 520 is located), somewhat obstructed (such as by smoke or physical obstacles), or a bit out of focus (based on a distance between the avatars that mirrors how objects far away from a person look less detailed and less focused) as presented to the first user because that's how the avatar 520 would look to someone if they were standing at the position of the user's avatar 510. The astute reader will appreciate that presenting the appearance of avatar 520 according to the position of avatar 510 can result in situations where the avatar 520 is not fully visible in the first user's augmented reality presentation even when the first user is physically closer to the location of the avatar 520 within the shared environment than the avatar 510 is to the avatar 520.

In another embodiment, environment engine 110 creates a visual rendering of each visual element in the environment subject to one or more limitations. For example, environment engine 110 can render the appearances of a group of users and the lighting conditions of the ambient environment but limit the number and types of visual elements that are rendered instead. In this way, environment engine 110 can introduce real-world limitations to social interaction, such as lighting conditions, without the including visual that do not meet a relevance threshold in creating an immersive environment (e.g., an object across a user in a dark room that would not be visible to a user). For example, a relevance threshold can include a minimum distance between each visual element and a minimum visibility level (i.e., how distinguishable a visual element would be relative to the position of a user). Based on whether each visual in a user's environment at least meets the one or more thresholds, environment engine 110 can render a collection of relevant visual elements to immerse a user in a virtual and/or augmented reality rendering of a shared environment.

FIG. 5B illustrates the shared environment of FIG. 5A from the perspective of the first user, where the avatars 510 and 520 are moving toward each other in the shared environment. As the avatars 510, 520 get closer together, the avatar 520 would be presented in increased fidelity and visual clarity to represent that the distance between the avatars would not affect how a person in the position of avatar 510 would see avatar 520. Likewise, as they get closer together, the environment engine takes into account how the effects of environmental factors in the real-world environment would decrease (e.g., easier to see through the smoke or in a darker part of the environment) and thus renders a clearer presentation of avatar 520 to the first user.

The movements of the avatars 510, 520 are controlled by their respective users. These can be console commands, entered via mouse and keyboard, game controller, stylus, touchscreen, etc. In embodiments, the commands can be visible not only to the controlling user of the avatar, but to other users as well.

It should be appreciated that a second user's view of the shared environment, including the avatars 510, 520 can be different than the first user's view. For example, a second user could be sitting at a different part of the real-world environment and thus have a different perspective of the scene, including the avatars. Thus, for the second user, the shared environment will be from a different perspective. Additionally, as noted above, the environment engine 110 can adjust the appearance of the avatars based on how they would look from another avatar's perspective. Thus, just as the first user of avatar 510 would see avatar 520 as if viewing from the perspective of the avatar 510, a second user's view of avatar 510 would similarly be affected by factors that would affect the view from the perspective of avatar 520.

Figure 6A:
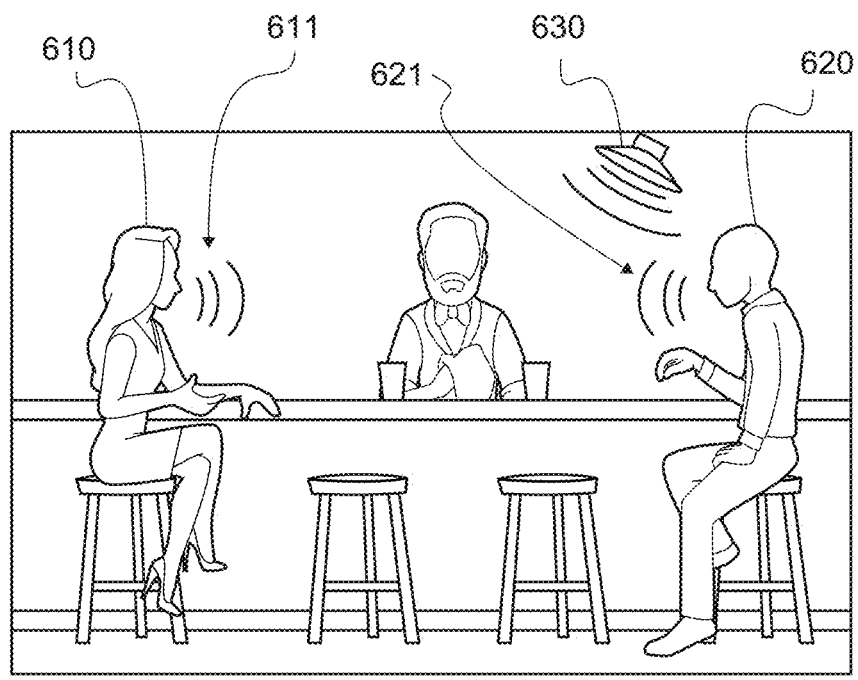
FIGS. 6A and 6B depict an illustrative embodiment of a shared environment subject to substantially similar auditory limitations of a corresponding real-world environment.
Figure 6B:
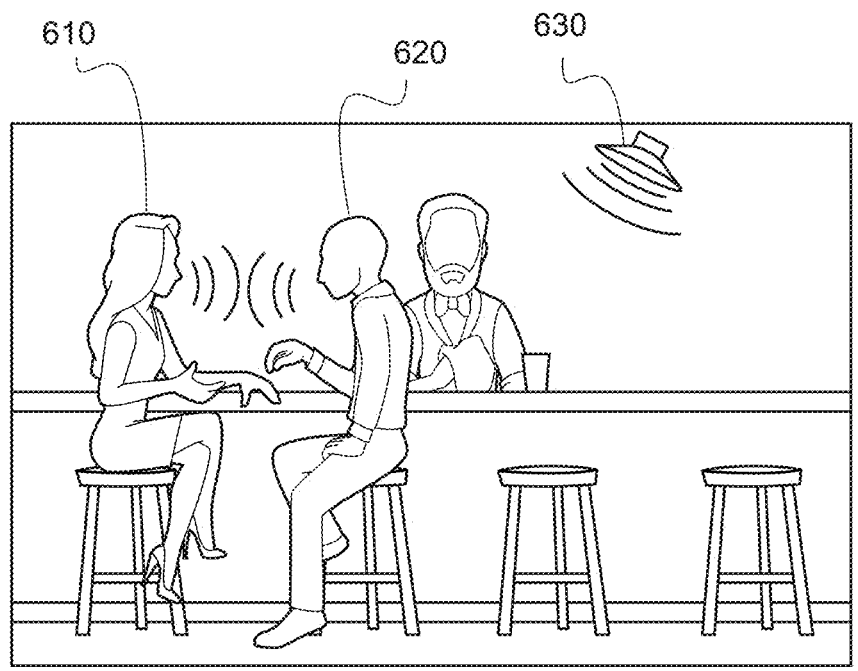

FIGS. 6A and 6B depict an illustrative embodiment of a shared environment subject to substantially similar auditory limitations of a corresponding real-world environment.

In one embodiment, environment engine 110 creates a stereo rendering of each sound in the environment that reflects the spatial position of sound in a user environment. For example, environment engine 110 can determine the spatial position of a first user relative to a second user in a shared environment and create a first stereo rendering of the ambient environmental noise, the second user's voice, and the first user's voice based on the spatial position of the first user relative to the spatial positioning of the ambient noise and user voices. In a related example, environment engine 110 can determine the spatial position of a second user relative to a first user in a shared environment and create a second stereo rendering of the ambient environmental noise, the first user's voice, and the second user's voice based on the spatial position of the second user relative to the spatial positioning of the ambient noise and user voices.

FIG. 6A illustrates a situation where the avatar 610 of the first user (the user whose view of the shared environment is seen in the figure) is sitting across the bar from avatar 620 of another user. In this example, the avatars 610, 620 are attempting to have a conversation (as represented by the lines 611, 621, respectively). Though the conversation can be voice of the first user (of avatar 610) and of a second user (of avatar 620) as received through a microphone, the environment engine 110 is programmed to take into account the distance between the avatars 610, 620 and affect the quality of the sound as heard by the other avatar accordingly. The way sound decreases over a distance is well-known, and the environment engine 110 applies this property so that the way a user of an avatar hears speech from another user's avatar varies depending on the distance between the speaking avatar and the listening avatar. Thus, even in a quiet shared environment, the way the users of the avatar hear other avatars is based on the avatars' locations within the shared environment. Consequently, the sounds the users of the avatars hear are from the perspective of the avatars and not their real-world actual locations. Additionally, the environment engine 110 is programmed to modify the speech volume and quality based on the directions that each of the avatars 610, 620 are facing. If a speaking avatar is facing away from the listening avatar, the speech volume is correspondingly lowered to mirror the real-world effect. Likewise, depending on the listening avatar's orientation, the environment engine 110 will adjust the sound so that directionally, the voice appears to be correctly coming from the speaking avatar's position relative to the listening avatar.

The real-world environment of FIG. 6A, however, is not a quiet environment. There are also environmental noises and sounds, as represented by the icon 630. Thus, the environment engine 110 is also programmed to take into account the detected environmental sounds and accordingly affect the way that a user of avatar 610 can hear the voice of avatar 620.

FIG. 6B shows the two avatars 610, 620 much closer together than in FIG. 6A. Because the distance between the avatars 610, 620 is much less in FIG. 6B, the first user of avatar 610 will be able to much clearly hear the voice from the avatar 620. Though there is ambient noise as represented by icon 630, this ambient noise won't interfere with the conversation between the avatars because of the short distance between the avatars 610, 620.

In embodiments, the environment engine 110 can modify a voice coming from an avatar based on user-controllable gestures executed by the avatar. For example, if a user executes a gesture that is indicative of excitement, anger or emphasis, the environment engine 110 amplifies the voice coming from the avatar. Examples of this can include gesturing with hands or arms, stamping feet, striking a surface with a hand, etc.

In embodiments, the environment engine 110 is programmed to execute sound effects when the avatars interact with virtual or mixed-reality objects in the shared environment. For example, if an avatar walks around, the environment engine 110 will execute sound effects that can vary based on the surface of the real-world environment (e.g., walking on a hardwood floor versus a carpet, with sandals versus with dress shoes worn by the avatar, etc.). Other such actions can include a door opening, striking a surface with a hand, etc.

In another embodiment, environment engine 110 creates a stereo rendering of each sound in the environment subject to one or more limitations. For example, environment engine 110 can render the voices of a group of users and the sounds of the ambient environment but limit the number and types of noises that are rendered instead. In this way, environment engine 110 can introduce real-world limitations to social interaction, such as competing voices and ambient noise, without the including noises that do not meet a relevance threshold in creating an immersive environment. For example, a relevance threshold can include a minimum distance between each sound-emitting element and a minimum perceived decibel level (i.e., how loud a sound would be relative to the position of a user). Based on whether each sound in a user's environment at least meets the one or more thresholds, environment engine 110 can render a collection of sounds in stereo-form to immerse a user in a virtual and/or augmented reality rendering of a shared environment.

It should be noted that the examples of FIGS. 5A-5B and 6A-6B illustrate the visual effects and audio effects, respectively, according to embodiments of the inventive subject matter. The visual and audio effects of the shared environment were illustrated separately for the purposes of simplicity and ease of understanding. However, it should be appreciated that the shared environment will, in most embodiments, incorporate the features discussed with respect to FIGS. 5A-5B as well as those of FIGS. 6A-6B such that a complete audiovisual shared environment experience is provided to the users.

The inventive subject matter can provide users with anonymity and safety in a social setting. For example, consider that the first user and second user (both present somewhere in the real-world bar) first meet through their avatars 510, 520 respectively.

As discussed herein, the perspectives of each of the users of the avatars can be different. This is especially when each user's perspective comes from their own device. However, in other embodiments, multiple users can use the same third-person perspective of the scene with the avatars. In some variations of these embodiments, a user can interact with a user interface that instructs the environment engine 110 to share their perspective with another user. This allows another user to see from their perspective. In situations where multiple cameras are present in a real-world environment, a user can choose which of the available camera perspectives they wish to use.

In embodiments, a user can manipulate the third-person perspective by using commands such as zooming, panning of a camera, changing the focus of the camera, etc.

Figure 7A:
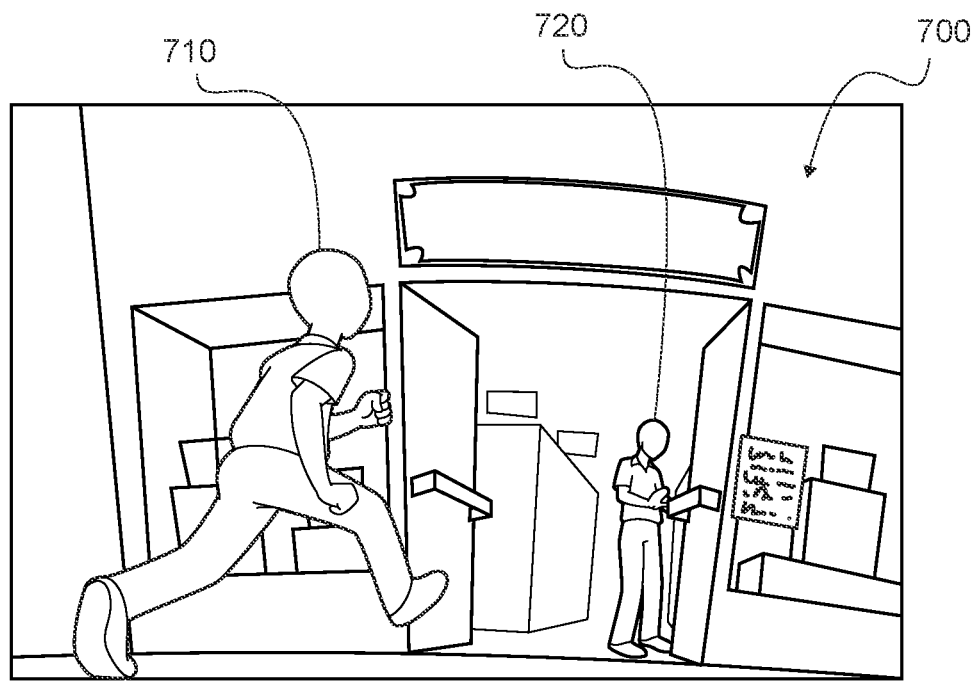
FIGS. 7A and 7B depict an illustrative embodiment of a shared environment subject to substantially similar limitations on accessibility as a corresponding real-world environment.
Figure 7B:
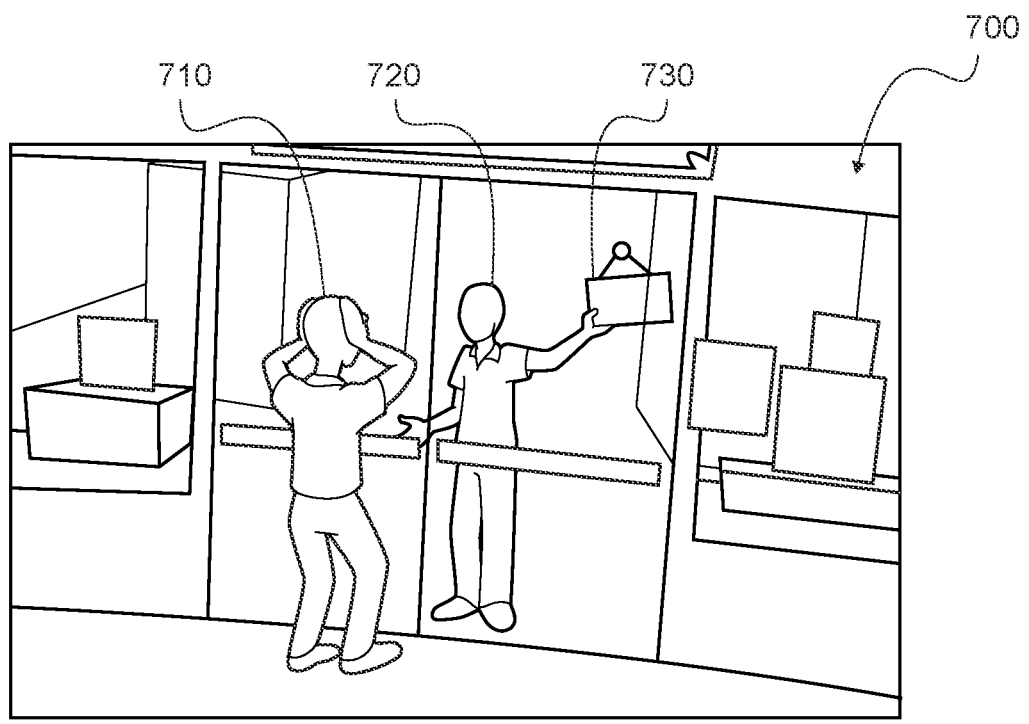

FIGS. 7A and 7B depict an illustrative embodiment of a shared environment subject to substantially similar limitations on accessibility as a corresponding real-world environment.

FIG. 7A shows avatar 710 of a first user running towards a store 700 as it is about to close. As shown in FIG. 7B, the avatar 710 is too late and the store has already closed.

In this situation, the environment engine 110 is programmed to limit access to the shared environment within the store 700 to the same extent that the locked real-world physical doors prevent access to the store in the real-world. A virtual door or other barrier would be mapped within the shared environment to the location of the physical doors such that the avatar 710 thus would not be able to proceed inside the store.

In FIG. 7B, a person 720 is seen interacting with a sign 730 while communicating with the avatar 710. In some embodiments, the person 720 can be an actual person in the store 700 that can see the avatar 710 via goggles or other augmented reality device, and as such communicate with the avatar 710. In this situation, the sign 730 would be a real-world sign that the person 720 is manipulating. In other embodiments, the person 720 can also be an avatar in the shared environment that is under the control of a second user, and the sign 730 can be a virtual sign in the shared environment.

In one embodiment, environment engine 110 subjects a user to the real-world limitations of an environment based on logistical limitations of a real-world environment. For example, environmental engine 110 can restrict a user's access to a virtual storefront that reflect a real-world store location based on the business hours associated with the real-world store location. In another example, environmental engine 110 can restrict a user under the minimum age to purchase alcohol from a virtual representation of a real-world bar. In yet another example, environmental engine 110 can allow a user into a virtual representation of a restaurant but prohibit the user from purchasing a real-world alcoholic beverage for a real-world diner based on age restrictions.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer-implemented method of incorporating real-world limitations into a shared, environment, concurrently renderable by first and second users, comprising:
   receiving a user selection of a shared environment, wherein the shared environment represents a real-world environment;
   retrieving spatial data associated with the shared environment;
   retrieving environmental sensor data associated with the shared environment, wherein the environmental sensor data captures a varying ambient environment of the shared environment, and wherein the environmental sensor data includes at least one of audio data and image data;
   rendering an avatar of the first user within the shared environment from a first third-person perspective; and
   rendering an avatar of the second user within the shared environment from a second third-person perspective.

2. The method of claim 1, further comprising using at least stereo rendering to the first and second users, of sounds actually occurring within the real-world environment, such that the first and second users perceive the sounds to be positionally oriented with respect to their respective avatars.

3. The method of claim 1, further comprising rendering to the second user, apparent speech of the first avatar using a volume that varies according to varying apparent distances of the first and second avatars, within the shared environment.

4. The method of claim 1, further comprising rendering to the second user, apparent speech of the first avatar using a volume that varies according to an apparent facial direction of the first avatar with respect to the second avatar, within the shared environment.

5. The method of claim 1, further comprising rendering to the second user, apparent speech of the first avatar using a volume that varies according to apparent facial directions of both the first and second avatars, within the shared environment.

6. The method of claim 1, further comprising rendering to the second user, apparent speech of the first avatar using a volume that varies according to apparent hand movements of the first avatar, with respect to the mouth of the first avatar, within the shared environment.

7. The method of claim 1, further comprising rendering to at least one of the first and second users, a sound corresponding to an apparent interaction of a body part of the first avatar with respect to an object in the real-world environment.

8. The method of claim 7, wherein the apparent interaction comprises at least one of the first avatar (a) stamping its foot on the floor, hitting a wall with a hand, and using a hand to open a door.

9. The method of claim 1, further comprising rendering to the first user, volumes of sounds occurring in the real-world that vary according to apparent distances between a source of the sounds and the first avatar, within the shared environment.

10. The method of claim 1, further comprising rendering mouth movements of the first avatar to correspond with text created or spoken speech of the first user, in a manner that is visible to both the first and second users.

11. The method of claim 1, further comprising rendering limb movements of the first avatar to correspond with physical limb movements of the first user, in a manner that is visible to both the first and second users.

12. The method of claim 1, further comprising rendering walking movements of the first avatar to correspond with console-based instructions from the first user, in a manner that is visible to both the first and second users.

13. The method of claim 1, further comprising rendering facial expressions of the first avatar to correspond with console-based instructions from the first user, in a manner that is visible to both the first and second users.

14. The method of claim 1, wherein the first third-person perspective is different from the second third-person perspective.

15. The method of claim 1, wherein at least one of the first and second users can control sharing of the first third-person perspective with the second person.

16. The method of claim 1, further comprising providing the first user with a control to manipulate the first third-person perspective.

* * * * *